United States Patent [19]

Schoen

[11] 4,420,981

[45] Dec. 20, 1983

[54] MANOMETER SWITCHING VALVE

[75] Inventor: Otmar Schoen, Scheidterberg, Fed. Rep. of Germany

[73] Assignee: Flutec Fluidtechnische Geraete GmbH, Fed. Rep. of Germany

[21] Appl. No.: 377,076

[22] Filed: May 11, 1982

[30] Foreign Application Priority Data

May 19, 1981 [DE] Fed. Rep. of Germany ....... 3119858

[51] Int. Cl.³ ............................................ G01L 19/00
[52] U.S. Cl. ................................. 73/756; 137/625.12
[58] Field of Search ................... 73/756; 137/625.11, 137/625.19

[56] References Cited

U.S. PATENT DOCUMENTS 3,881,358 5/1975 Wolfges ........................... 73/756
4,196,634 4/1980 Hehl .................................. 73/756

FOREIGN PATENT DOCUMENTS 2241883 7/1974 Fed. Rep. of Germany.
2725575 12/1978 Fed. Rep. of Germany.

Primary Examiner—Donald O. Woodiel
Attorney, Agent, or Firm—Roylance, Abrams, Berdo & Goodman

[57] ABSTRACT

A switching valve for the selective connection of each of a plurality of measuring locations with a manometer has a first valve body mechanically connected to the manometer and a second valve body rotatable with respect to the manometer, the second body having a radial control bore connected constantly with the measuring bore of the manometer. In order to attain tight closure between the two valves without the use of seat valves, the second valve has a spherical zone into which opens a control bore. In the other part are a plurality of packing bodies, the number of which corresponds to the number of measuring locations, each of the packing bodies having a central bore in a plane perpendicular to the axis of the first valve, each packing body have an annular sealing surface which is in constant contact with the spherical zone. A chamber including the spherical zone can be connected outside of the packing surfaces to a vent tank.

6 Claims, 5 Drawing Figures

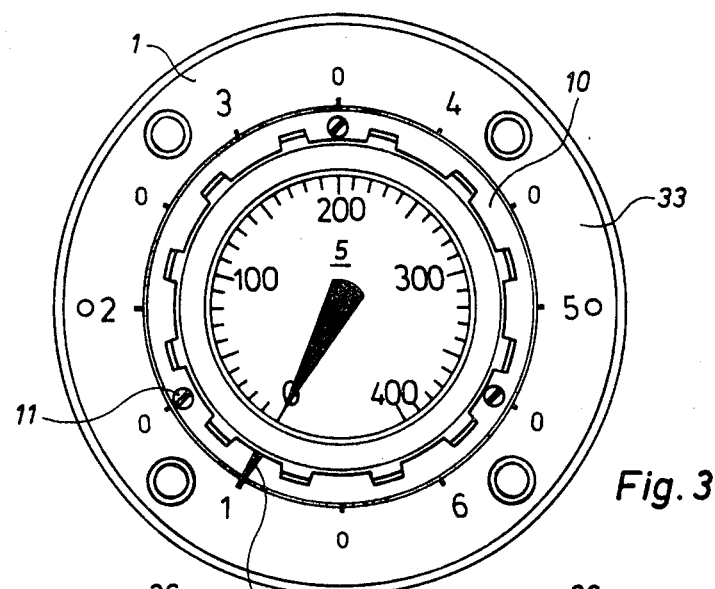
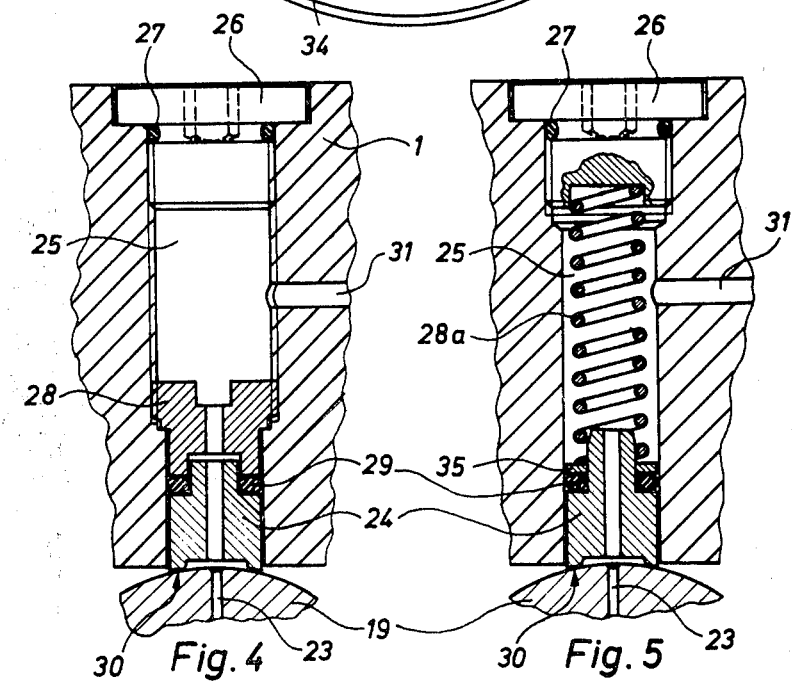
Fig. 3
Fig. 4    Fig. 5

MANOMETER SWITCHING VALVE

This invention relates to a valve of the type designed to selectively and sequentially connect a manometer to a plurality of points at which measurements are to be made.

BACKGROUND OF THE INVENTION

A known switching valve for the same general purpose as that of the present invention is shown in German Offenlegungsschrift No. 22 41 883, in which two valve bodies are configured as oppositely rotatable rotary slide valves. A space exists between those bodies, permitting troublesome leakage losses especially when measuring the pressure of fluid which is of low viscosity.

A solution to this leakage problem is proposed in German OS No. 27 52 575 which shows a plurality of valve seats, corresponding in number to the measuring points, on a rotary slide valve, the valve members for which must be moved each time out of their closed positions against the force of a spring which requires the use of considerable force.

It is also known, when using ball cocks, to use packing bodies with annular packing surfaces. These packing bodies and packing surfaces are of a very rugged nature and no notice need be taken of them here, whether their annular packing surfaces are pressed more or less strongly against the spherical zone.

BRIEF DESCRIPTION OF THE INVENTION

An object of the invention is to provide a switching valve which closes tightly and which does not require the closing of one valve and the opening of another during the switching from one measuring location to another.

Briefly described, the invention includes a switching valve for selectively interconnecting a manometer and each of a plurality of locations to be measured, comprising a manometer having a measuring passage; a first valve body mechanically coupled to said manometer; a second valve body rotatably coupled to said first body, said second body having a radial control bore continuously coupled to said measuring passage of said manometer, and a spherical zone through which said control bore opens; said first valve body having a portion surrounding said spherical zone comprising a plurality of bores extending radially relative to said spherical zone, a packing body in each said bore, each body having a control opening and an annular sealing surface having a greater diameter than the opening of said control bore, means for urging each said sealing surface into contact with said spherical zone, said spherical zone having a space between said sealing surfaces, and means for defining a volume enclosing said spherical zone and for connecting said volume to a reservoir whereby said manometer can be coupled to said reservoir between said packing bodies.

As will be recognized from the following description, the "seat" members or packing bodies work against a spherical surface and therefore constantly retain their positions. None of the packing bodies needs to be raised out of its closed position against the force of a spring in order to permit the apparatus to provide or change a connection between one of the measuring points and the manometer, as is the case with switching valves having conventional valve seats.

In order that the manner in which the foregoing and other objects are obtained in accordance with the invention can be understood in detail, particularly advantageous embodiments thereof will be described with reference to the accompanying drawings, which form a part of this specification, and wherein:

FIG. 3 is a front elevation, in the direction of arrow A, of the apparatus of FIGS. 1 and 2, with the apparatus being rotated through an angle of 45° about its axis from the position illustrated in FIG. 1;

FIG. 4 is an enlarged, fragmentary view of a portion of FIG. 1; and

FIG. 5 is a view of a further embodiment of an apparatus in a view similar to FIG. 4.

Figure 1:
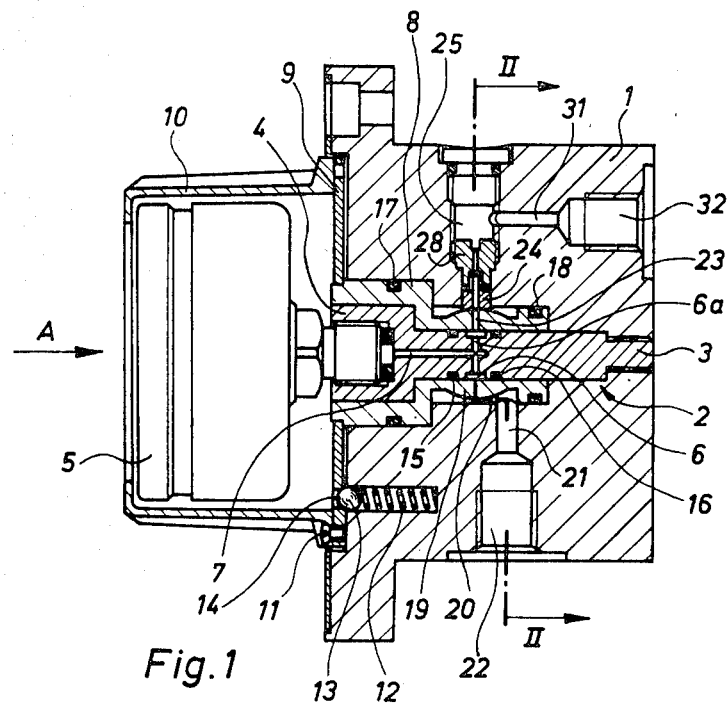
FIG. 1 is a side elevation, in longitudinal section, of a switching valve with a manometer in accordance with the present invention.
Figure 2:
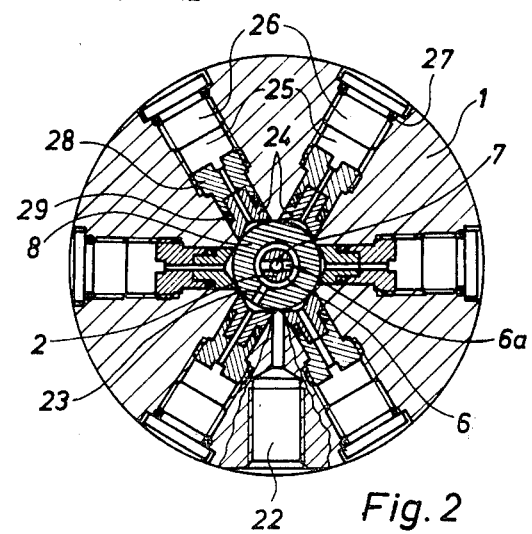
FIG. 2 is a transverse sectional view along line II—II of FIG. 1.

The switching valve in accordance with the present invention includes an outside part 1, which constitutes the main housing of the apparatus, having a central bore into which is inserted a cylindrical inside part 2 with an externally threaded end 3 which threadedly engages outside part 1. The inside part 2 has an annular groove 6 and a blind axial bore 7 which is connected to a manometer 5. Inside part 2 also has a transverse bore 6a which interconnects bore 7 with groove 6.

Outside part 1 and inside part 2 form a first valve body 1, 2 with an annular gap therein. A second valve body 8 is located in the annular gap between outside part 1 and inside part 2 and extends from the manometer generally axially beyond radial bore 6a but not as far as threaded connection 3. A disc 9 is fixedly attached to the end of second valve member 8 closest to manometer 5, disc 9 lying between outside part 1 and a hollow rotary head 10 which is fixedly coupled to disc 9, head 10 being shaped to surround the stationary manometer 5 with some spacing. Rotary head 10 is connected with disc 9 by means of screws 11. Thus, head 10, disc 9 and member 8 are rigidly interconnected to be rotatable together. A detent assembly including a helical spring 12 and a detent ball 13 cooperates with detent openings 14 in disc 9 to position a rotatable disc 9 and housing 10 in any one of a plurality of circularly spaced positions determined by openings 14. The spring 12 is axially mounted in part 1 and urges ball 13 toward the manometer, into bores 14.

On opposite axial sides of annular groove 6 are packing rings 15 and 16, lying in annular grooves in inside part 1, and sealing the space between inside part 2 and second valve body 8. The space between second valve body 8 and outside part 1 is sealed by packing rings 17 and 18 which are positioned in annular grooves in second valve body 8. Valve body 8 has a spherical zone 19 between packing rings 17 and 18, which zone has a space forming a chamber 20 opposite the adjacent inside wall of outside part 1, which chamber is connected through a bore 21 with a chamber 22 which is preferably connected with a supply tank. In the middle of spherical zone 19 is a single radial control bore 23 which is constantly in connection with annular groove 6 in inside part 2.

Six packing bodies 24 are uniformly arranged about the periphery of spherical zone 19 in the plane defined by control bore 23, the bodies being received in radial bores 25 in outside part 1. The outer ends of bores 25 are closed by threaded plugs 26, which are threaded into the internally threaded bores 25, and by O-rings 27 which surround plugs 26. Within each of radial bores 25 is a supporting screw 28 which is threadedly received in a threaded portion of bore 25 and has a non-threaded portion projecting toward the packing body received in the bore. An O-ring 29 is pressed by screw 28 against the packing body, the ring being positioned on a shoulder formed on the packing body. Because of this shoulder, an axial projection of smaller diameter projects from packing body 24 into a recess in screw 28. Each of body 24 and screw 28 has a central bore. As shown in FIG. 4, the arrangement is such that the pressure acting in axial bore 25, particularly from a pressurized fluid, also effects O-ring 29. On the side turned away from ring 29, packing body 24 has a sealing surface 30 which fits against the spherical zone and is in constant contact with the spherical surface. Surface 30 is wider than the diameter of control bore 23 in the area of spherical zone 19. Each of the radial bores 25 is connected through a connection passage 31 with an enclosure 32 (FIG. 1) to which one of the locations to be measured can be connected. Six connection bores 31 and six chambers 32 are provided, corresponding to the number of packing bodies 24, and are uniformly distributed around the periphery of body 1.

On the front side of outside part 1 adjacent to manometer 5 is provided a scale 33 (FIG. 3) which is numbered from "1" to "6". Between each of these numbers is found the number "0". The rotary head 10 has an indicator needle 34 which, as shown in FIG. 3, points to the number "1". As shown in FIG. 1, the measuring point connected to chamber 32 is coupled through bore 31, radial bore 25, the central bore of bolt 28 and the packing body, then through control bore 23, annular groove 6, radial bore 6a and blind bore 7 to manometer 5. Thus, the manometer measures the pressure at measuring point 1. If rotary head 10 is rotated in a clockwise direction, then indicator 34 arrives at the number "0" between the numbers "1" and "2". In this position, control bore 23 is positioned outside of one of the sealing surfaces 30 of packing body 24, i.e., angularly located between packing bodies, and is connected with chamber 20, as well as through bore 21, and to enclosure 22 with the reservoir (not illustrated) which is at atmospheric pressure so that manometer 5 is vented. If rotary head 10 is now rotated further in the clockwise direction, to the position at which indicator 34 points to number "2", then the measuring point 2 is connected in the described manner with manometer 5.

FIG. 5 shows a modification to the structure of FIG. 4 wherein, instead of having a supporting screw 28, a pressure spring 28a is provided, which spring presses through an intermediate washer 35, against O-ring 29. The sealing surface 30 of packing body 24 is pressed against spherical zone 19 by the pressure of this compression coil spring 28. As in the first embodiment, if a pressure medium acts in radial bore 25, the presssure of that medium works in both directions on packing body 24 so that, because of sealing surface 30, the force exerted in the direction of spherical zone 19 is greater than the force in the opposite direction. By proper selection of the size of sealing surface 30, the pressure capacity of packing body 24 can be freely selected within certain limits.

Instead of a threaded journal 3 in inside part 2, a screw can be inserted coaxially which holds inside part 2 in outside part 1. An enclosure plate can be attached to the side opposite manometer 5.

The packing bodies 24 preferably comprise a sprayable high quality plastic, e.g., polyoxymethylene, in which is embedded a lubricating material, e.g., molybdenum disulfide.

While certain advantageous embodiments have been chosen to illustrate the invention, it will be understood by those skilled in the art that various changes and modifications can be made therein without departing from the scope of the invention as defined in the appended claims.

What is claimed is:

1. A switching valve for selectively interconnecting a manometer and each of a plurality of locations to be measured, comprising
   a manometer having a measuring passage;
   a first valve body mechanically coupled to said manometer;
   a second valve body rotatably coupled to said first body, said second body having
      a radial control bore continuously coupled to said measuring passage of said manometer, and
      a spherical zone through which said control bore opens;
   said first valve body having a portion surrounding said spherical zone comprising
      a plurality of bores extending radially relative to said spherical zone,
      a packing body in each said bore, each body having a control opening and an annular sealing surface having a greater diameter than the opening of said control bore,
      means for urging each said sealing surface into contact with said spherical zone,
      said spherical zone having a space between said sealing surfaces, and
      means for defining a volume enclosing said spherical zone and for connecting said volume to a reservoir whereby said manometer can be coupled to said reservoir between said packing bodies.

2. A switching valve according to claim 1, wherein each said packing body has a packing ring and a shoulder on its side opposite said packing surface to support said packing ring 29 under pressure.

3. A switching valve according to claim 2, wherein said means for urging includes supporting screw for exerting pressure on said elastic packing ring.

4. A switching valve according to claim 2, wherein said means for urging is a spring pressing on said packing ring.

5. A switching valve according to claim 1, wherein said first valve body has a hollow cylindrical chamber to hold the hollow cylindrical second valve body.

6. A switching valve according to claim 5, wherein said first valve body is formed in two pieces, one part thereof being within the other part and the outside one of said parts surrounding said second valve body.

* * * * *